(12) United States Patent
Lai

(10) Patent No.: US 9,863,574 B2
(45) Date of Patent: Jan. 9, 2018

(54) SUPPORTING STRUCTURE AND DISPLAY DEVICE USING THE SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Cheng-Yi Lai, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/236,659

(22) Filed: Aug. 15, 2016

(65) Prior Publication Data
US 2017/0343152 A1 Nov. 30, 2017

(30) Foreign Application Priority Data
May 26, 2016 (TW) .............................. 105116536 A

(51) Int. Cl.
*G06F 1/16* (2006.01)
*F16M 11/38* (2006.01)
(Continued)

(52) U.S. Cl.
CPC ............... *F16M 11/38* (2013.01); *F16B 1/00* (2013.01); *F16M 11/10* (2013.01);
(Continued)

(58) Field of Classification Search
CPC ............................ G06F 1/1616; G06F 1/1681
See application file for complete search history.

(56) References Cited

U.S. PATENT DOCUMENTS 4,729,533 A * 3/1988 Hillary ................. B66F 7/0641
106/6
6,031,714 A * 2/2000 Ma ........................ G06F 1/1601
248/918

(Continued)

FOREIGN PATENT DOCUMENTS

| TW | I326400 | 6/2010 |
|---|---|---|
| TW | M449291 U1 | 3/2013 |

(Continued)

*Primary Examiner* — Adrian S Wilson
(74) *Attorney, Agent, or Firm* — ScienBiziP, P.C.

(57) ABSTRACT

A display device which can elevate and rotate to a position includes a base, a controlling member mounted to the base, and a supporting frame. A display is mounted on the supporting frame, and a first magnetic piece is positioned on the controlling member. A second magnetic piece is positioned on the supporting frame. The first and second magnetic pieces are configured to attract each other. The controlling member includes a first elastic piece between the base and the supporting frame. The first elastic piece retracts to enable the supporting frame to rotate. The controlling member can slide to detach the second magnetic piece from the first magnetic piece, and the first elastic piece retracts to allow an upward rotation of the supporting frame thereby changing height of the display.

20 Claims, 12 Drawing Sheets

(51) Int. Cl.
  *F16M 11/10* (2006.01)
  *F16B 1/00* (2006.01)
  *H05K 5/00* (2006.01)

(52) U.S. Cl.
  CPC ......... *G06F 1/1616* (2013.01); *H05K 5/0017* (2013.01); *F16B 2001/0035* (2013.01); *F16M 2200/044* (2013.01)

(56) References Cited

U.S. PATENT DOCUMENTS

| | | | |
|---|---|---|---|
| 6,134,103 A * | 10/2000 | Ghanma | F16M 11/24 248/917 |
| 6,430,038 B1 * | 8/2002 | Helot | G06F 1/1616 248/917 |
| D521,996 S * | 5/2006 | Kim | D14/375 |
| 7,245,481 B2 * | 7/2007 | Shimizu | F16M 11/046 248/284.1 |
| 7,505,254 B2 | 3/2009 | Sheng et al. | |
| 7,639,484 B2 * | 12/2009 | Chen | G06F 1/1616 361/679.21 |
| 7,778,017 B2 | 8/2010 | Huang | |
| D704,156 S * | 5/2014 | Lee | D14/126 |
| 2001/0017761 A1 * | 8/2001 | Ditzik | G06F 1/16 361/679.06 |
| 2005/0213298 A1 | 9/2005 | Doherty et al. | |
| 2006/0187626 A1 | 8/2006 | Ditzik | |
| 2016/0091934 A1 | 3/2016 | Oakley | |

FOREIGN PATENT DOCUMENTS

| | | |
|---|---|---|
| TW | M464715 U | 11/2013 |
| TW | M489318 U | 11/2014 |
| TW | 201510404 A | 3/2015 |
| TW | I498708 B | 9/2015 |
| TW | I519924 B | 2/2016 |
| TW | I528889 B | 4/2016 |
| WO | 2015016847 A1 | 2/2015 |

* cited by examiner

SUPPORTING STRUCTURE AND DISPLAY DEVICE USING THE SAME

CROSS-REFERENCE TO RELATED APPLICATIONS

This application claims priority to Taiwan Patent Application No. 105116536, filed on May 26, 2016, the contents of which are incorporated by reference herein.

FIELD

The subject matter herein generally relates to support structures.

BACKGROUND

Display devices include a display unit, a base, and a connecting member attached between the display and the base. The connecting member is mounted to the base and may only allow horizontal or vertical pivoting of the display. It would be better to have an additional degree of freedom by being able to control of the height of the display in such a display device configuration. Therefore, there is room for improvement within the art.

BRIEF DESCRIPTION OF THE DRAWINGS

Implementations of the present technology will now be described, by way of example only, with reference to the attached figures.

DETAILED DESCRIPTION

Figure 1:
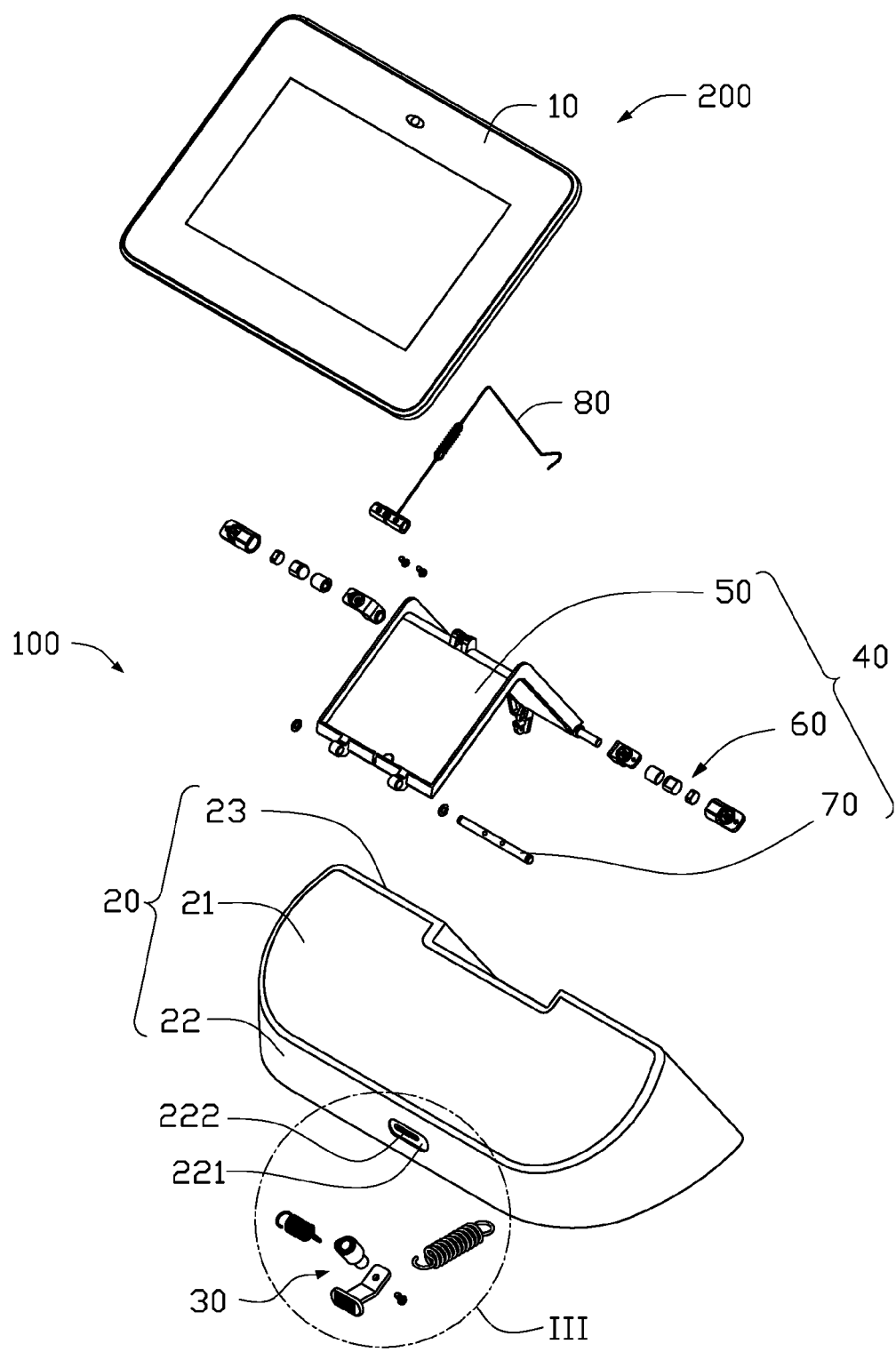
FIG. 1 is an exploded view of a display device support structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like.

Figure 2:
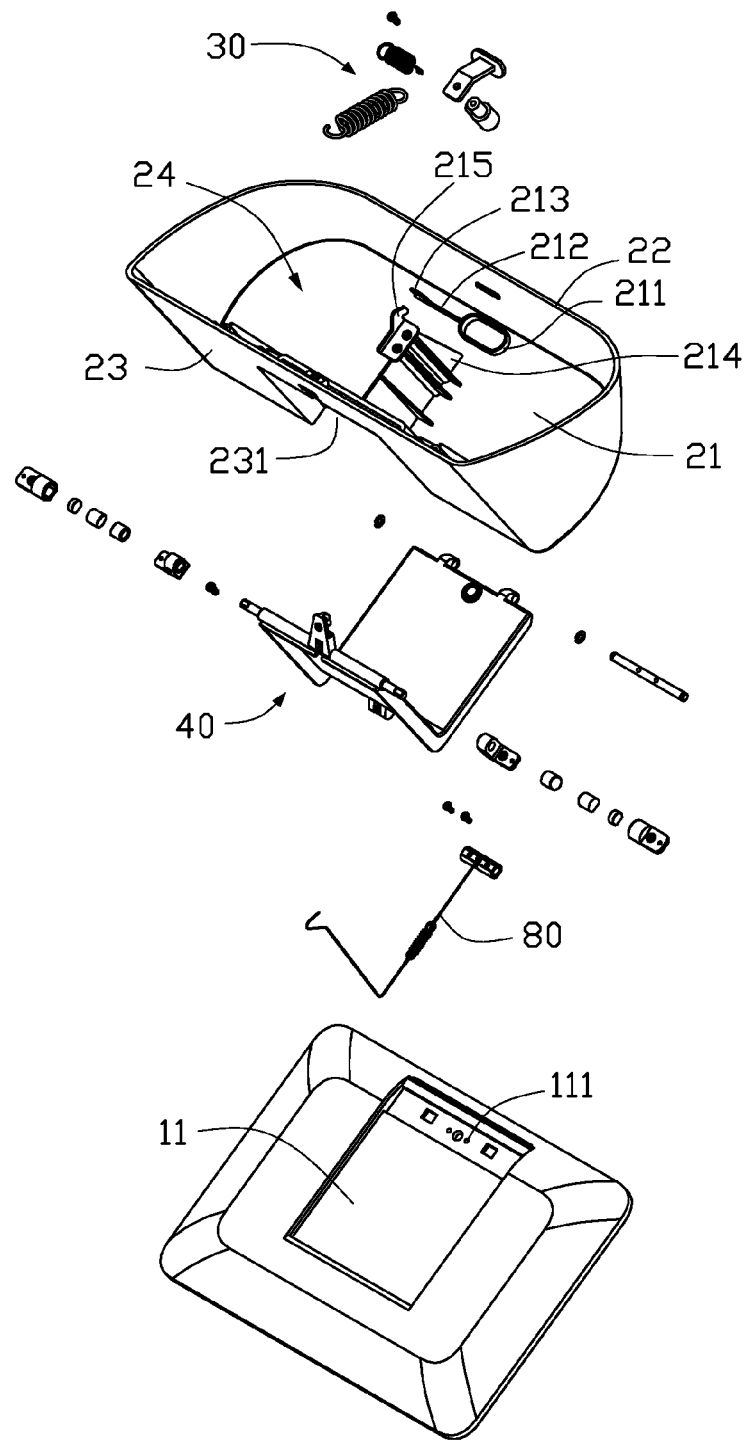
FIG. 2 is an alternate view of FIG. 1.

FIGS. 1 and 2 illustrate a display device 200 which includes a supporting structure 100 and a display 10. The structure 100 includes a base 20, a controlling member 30 mounted in the base 20, a supporting member 40 mounted on the base 20, and a transferring member 80 mounted on the base 20.

A rear side of the display 10 defines a recess 11. The recess 11 is configured to receive the supporting member 40. The display 10 further defines a number of installing holes 111 for connecting the supporting structure 100.

The base 20 includes a top plate 21, a front plate 22, and a rear plate 23. The front plate 22 and the rear plate 23 are attached to opposite edges of the top plate 21. The top plate 21, the front plate 22, and the rear plate 23 together define a receiving space 24 for receiving the supporting member 40 and the transferring member 80.

Figure 8:
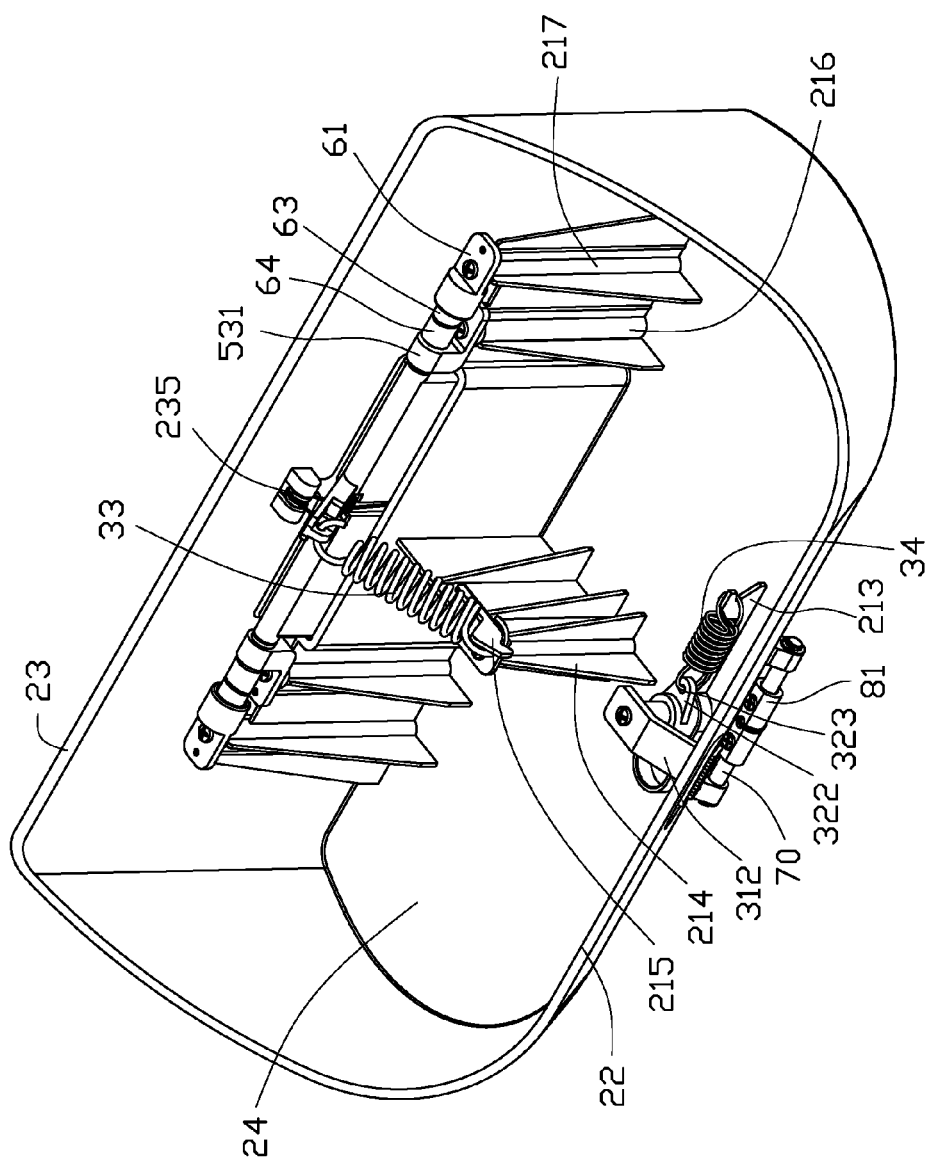
FIG. 8 is an alternate view of FIG. 7.

A ring 211 protrudes from an inside portion of the top plate 21 adjacent to the front plate 22. The controlling member 30 can be received in the ring 211. A restriction plate 212 perpendicularly protrudes from an inside portion of the top plate 21. The restriction plate 212 is adjacent to the ring 211. An end of the restriction plate 211 away from the ring 211 defines a locking groove 213. A pillar 214 protrudes from a middle inside portion of the top plate 21. A hook 215 is mounted on the pillar 214. FIG. 8 illustrates two first supporting plates 216 and two second supporting plates 217 perpendicularly protruding from two edges of a side of an inside portion of the top plate 21 adjacent to the rear plate 23. The two first supporting plates 216 are positioned between the two second supporting plates 217.

Figure 7:
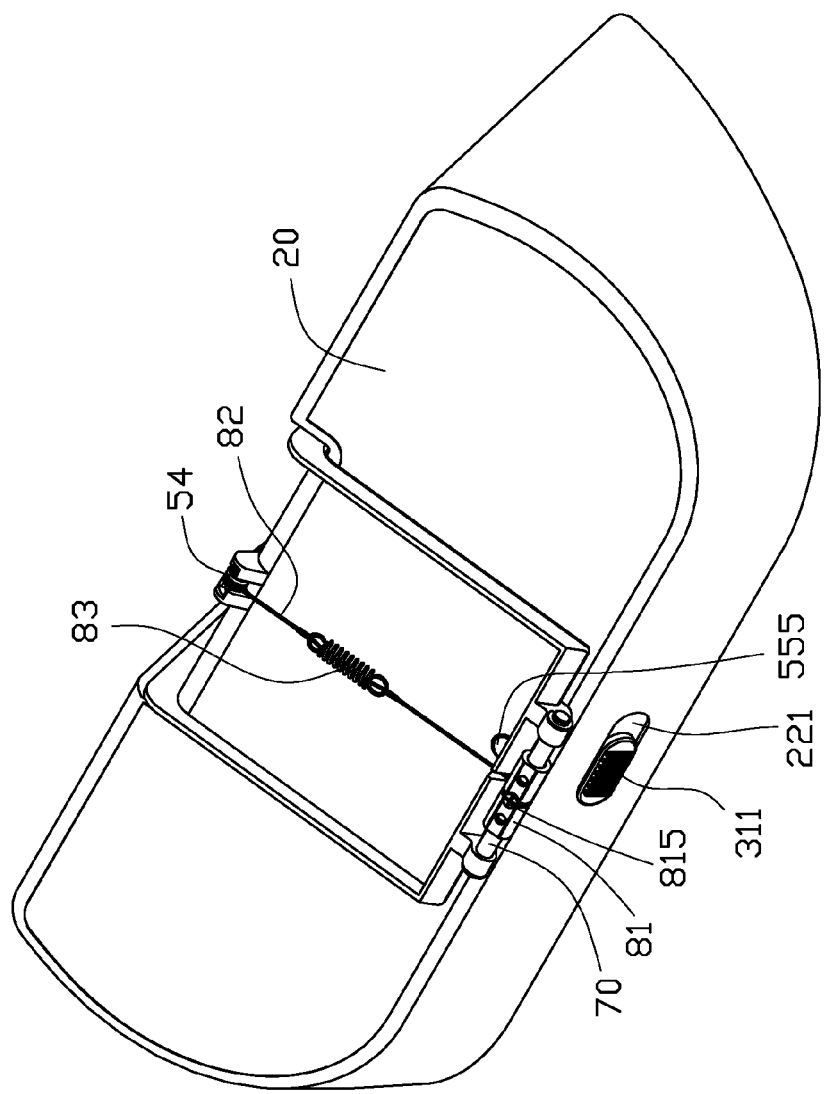
FIG. 7 is an isometric view of the support structure of FIG. 1.

The front plate 22 defines a groove 221 and an opening 222 formed inside the groove 221. The controlling member 30 can pass through the opening 222 to slide in the groove 221. The rear plate 23 defines a recessed portion 231. An inside portion of the recessed portion 231 protrudes into the receiving space 24. FIG. 8 illustrates a first pulley 235 mounted on a side of an inside portion of the rear plate 23 adjacent to the receiving space 24. The transferring member 80 can go around the top plate 21 and the rear plate 23 to attach to the first pulley 235 (as shown in FIGS. 2 and 7).

Figure 3:
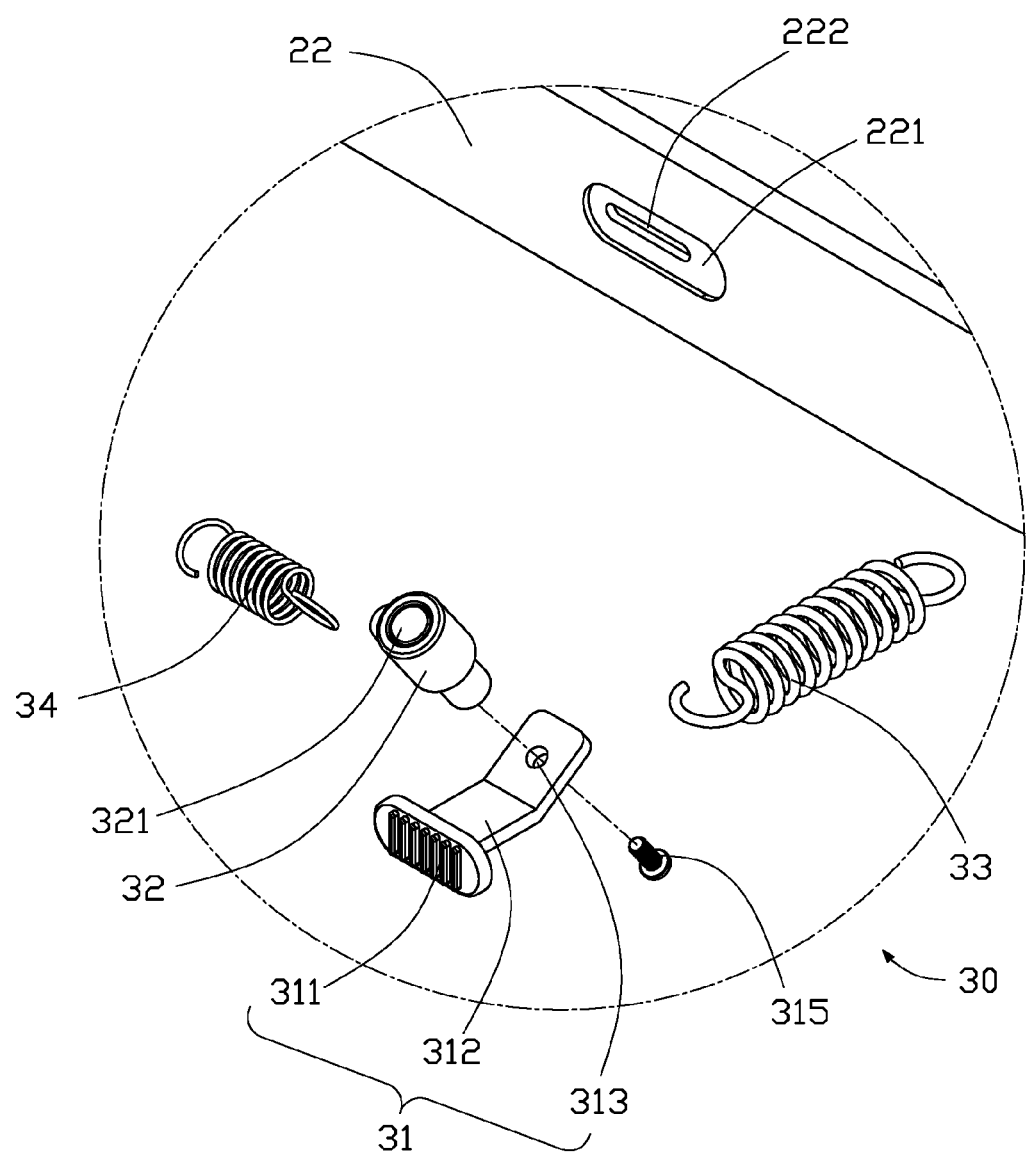
FIG. 3 is an enlarged view of circled portion III of FIG. 1.

FIG. 3 illustrates the controlling member 30 which includes a button 31, a sleeve 32 attached to the button 31, a first elastic piece 33, and a second elastic piece 34. The button 31 includes an operation plate 311 and a positioning plate 312 mounted on the operation plate 311. The operation plate 311 can be slidably received in the groove 221. The positioning plate 312 can pass through the opening 222 to be received in the receiving space 24 (shown in FIGS. 2 and 10). An end of the positioning plate 312 away from the operation plate 311 defines a through hole 313. A mounting member 315 can pass through the through hole 313 to engage in the sleeve 32, to mount the sleeve 32 to the button 31.

One end of the sleeve 32 is attached to the positioning plate 312 through the mounting member 315. A first magnetic piece 321 is received in an end of the sleeve 32. The other end of the sleeve 32 is received in the ring 211 (as shown in FIG. 2). FIG. 8 illustrates a limb 322 extending perpendicularly from the surface of sleeve 32. The limb 322 defines a connecting hole 323. An end of the first elastic piece 33 can be mounted to the hook 215. Two ends of the second elastic piece 34 can be locked in the locking groove 213 and the connecting hole 323. The second elastic piece 34 retracts to restore button 31 to a set position.

Figure 4:
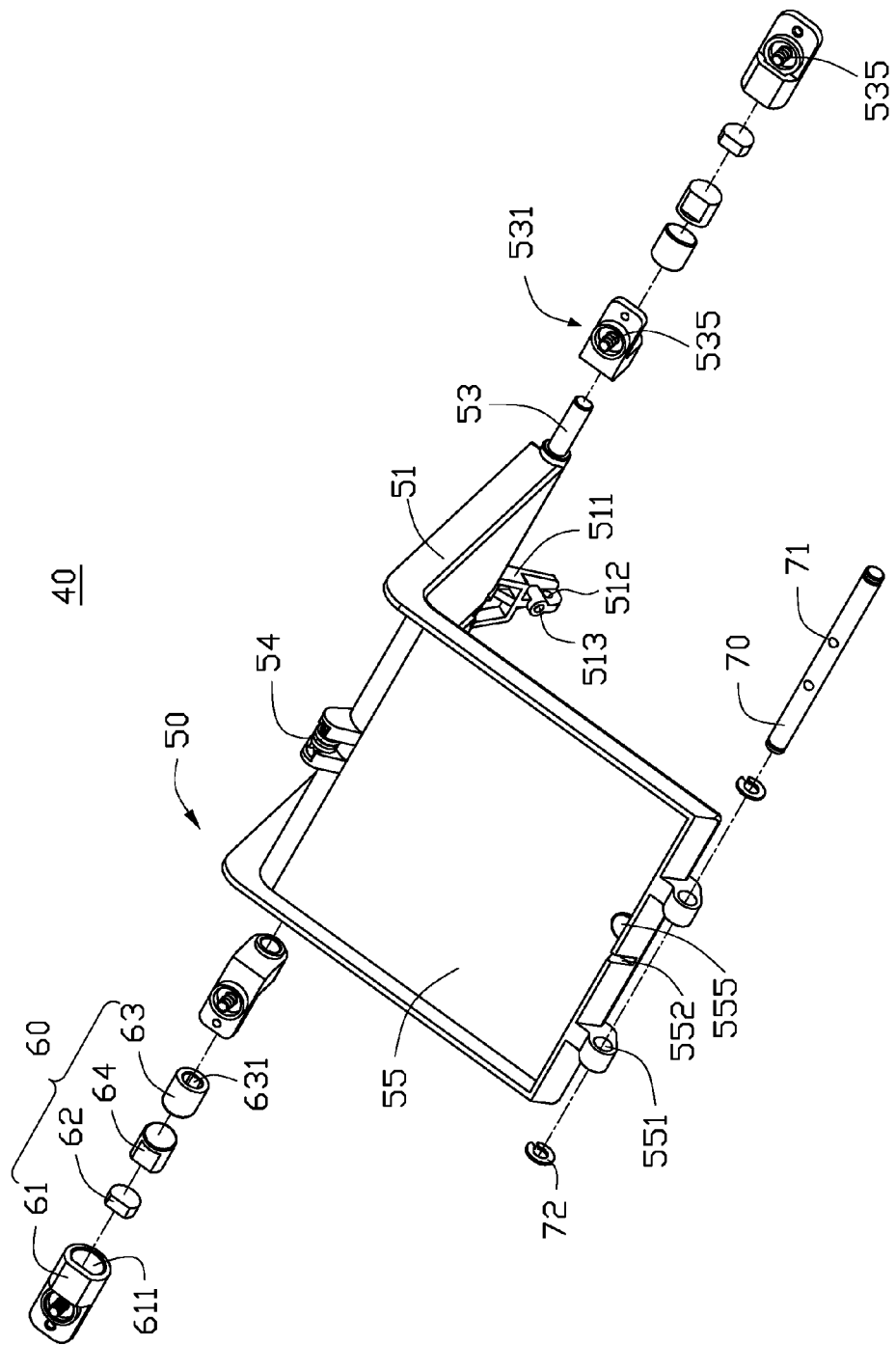
FIG. 4 is an exploded view of the support structure of FIG. 1.
Figure 5:
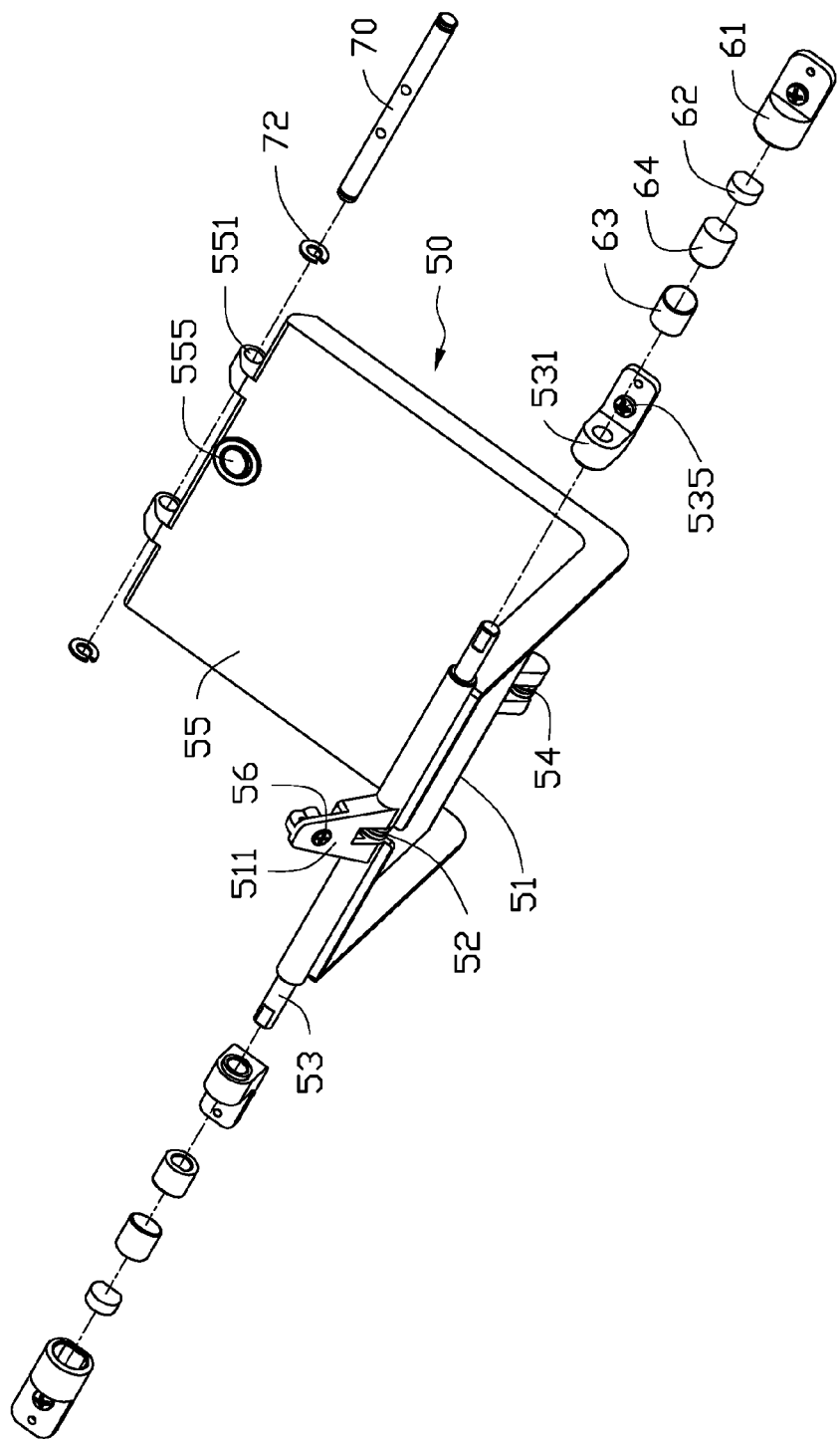
FIG. 5 is an alternate view of FIG. 4.

FIGS. 4 and 5 illustrate the supporting member 40 which includes a supporting frame 50, two damping members 60, and a rotation shaft 70. The two damping members 60 are mounted on two ends of the supporting frame 50. The rotation shaft 70 is rotatably mounted on the supporting frame 50. The supporting frame 50 includes a first supporting plate 51 and a second supporting plate 55 perpendicularly connected to the first supporting plate 51. The first supporting plate 51 is received in the recessed portion 231. The second supporting plate 55 abuts against the top plate 21 (shown in FIGS. 1 and 2).

Figure 10:
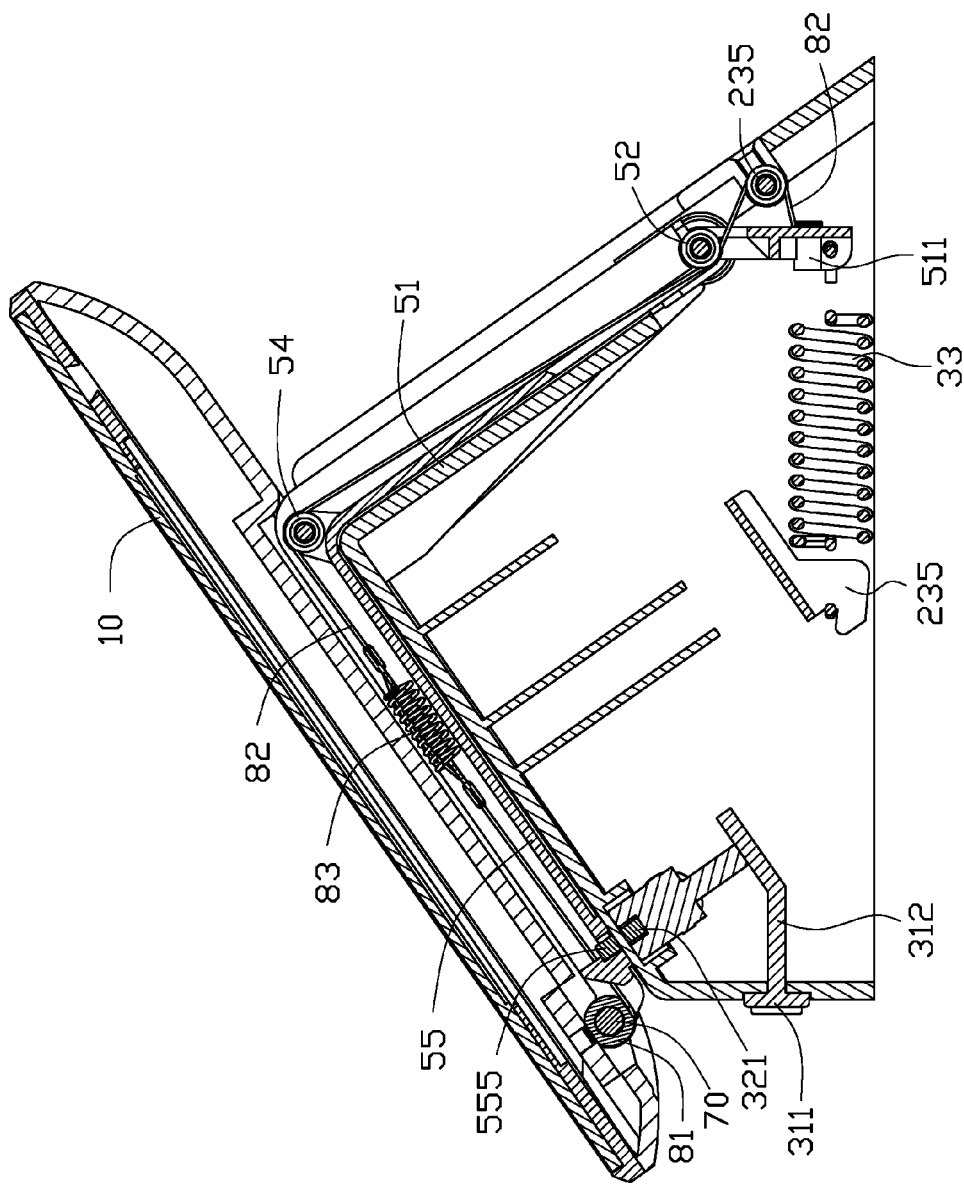
FIG. 10 is a cross-sectional view taken along line X-X of FIG. 9.

A connecting plate 511 extends from an edge of the first supporting plate 51 away from the second supporting plate 55. The connecting plate 511 defines a locking hole 512 and a screw hole 513. An end of the first elastic piece 33 can be engaged in the locking hole 512. A fastener 56 can fix the transferring member 80 to the screw hole 513. A second pulley 52 is mounted on the first supporting plate 51 and the connecting plate 511. The transferring member 80 can go around the supporting frame 50 to attach to the second pulley 52 (as shown in FIGS. 2 and 10). Two fixing shafts 53 protrude from the first supporting plate 51 and are positioned at opposite sides of the connecting plate 511. A cross section of the fixing shaft 53 is substantially D-shaped. A clamping piece 531 slides into the fixing shaft 53. The fixing shaft 53 can rotate in the clamping piece 531. A number of fasteners 535 can pass through the clamping piece 531 to engage in the first supporting plates 216 to fix the clamping piece 531 to the base 20 (as shown in FIG. 8). A third pulley 54 is attached to the first supporting plate 51 and the second supporting plate 55. The transferring member 80 can go around the supporting frame 50 to attach to the third pulley 54 (as shown in FIGS. 2 and 10).

Figure 12:
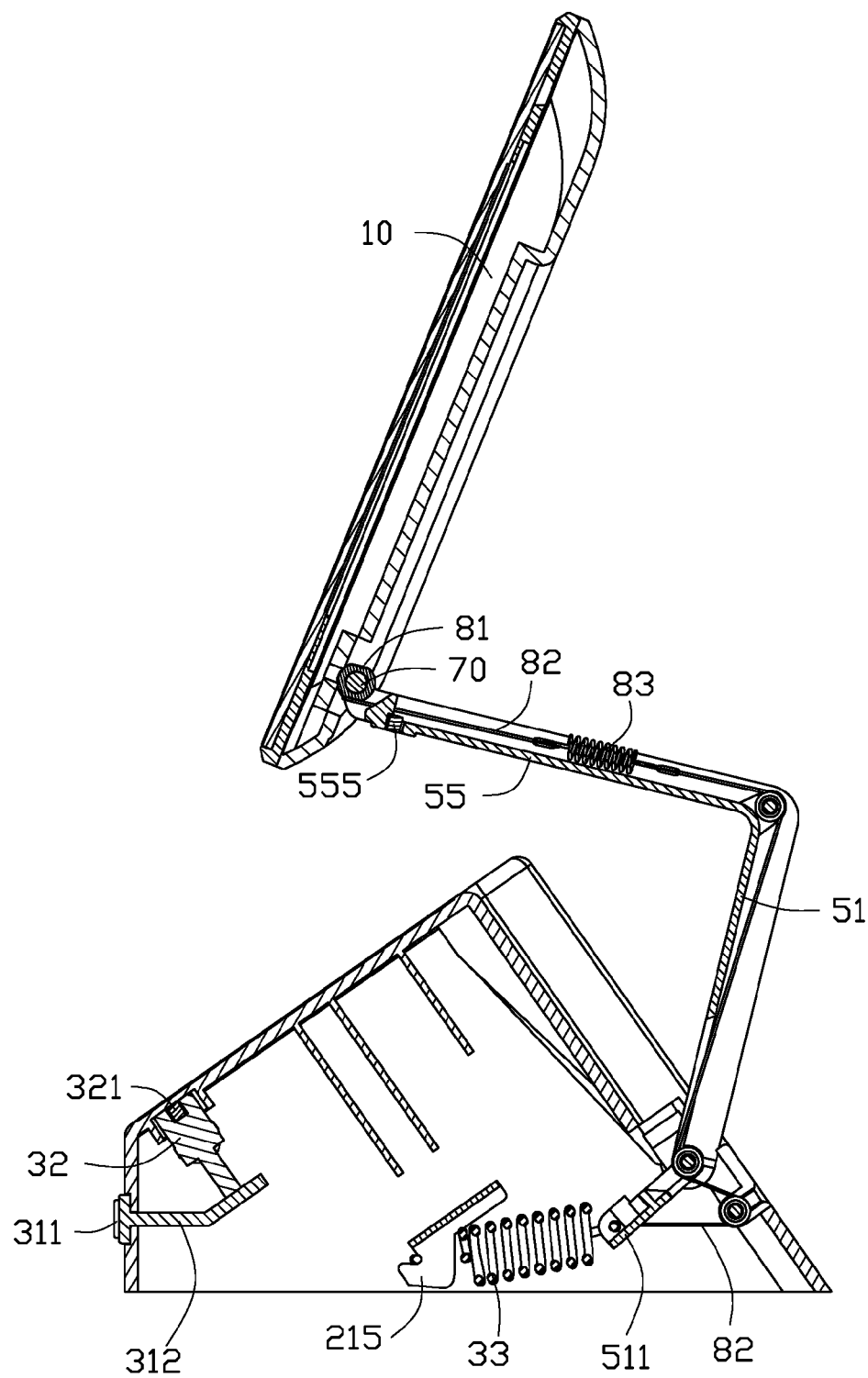
FIG. 12 is a cross-sectional view taken along line XII-XII of FIG. 11.

An edge of the second supporting plate 55 away from the first supporting plate 51 defines two through holes 551. The rotation shaft 70 can be rotatably received in the through holes 551. The second supporting plate 55 defines a gap 552 positioned between the through holes 551. The transferring member 80 can pass through the gap 552. A second magnetic piece 555 is mounted on an inner portion of the second supporting plate 55 and is adjacent to the gap 552. The first magnetic piece 321 is configured to attract the second magnetic piece 555 (as shown in FIG. 12).

The damping member 60 includes a mounting frame 61, a damping piece 62, a first wedge 63, and a second wedge 64. The damping piece 62 is received in the mounting frame 61. The first wedge 63 slides onto the fixing shaft 53. The second wedge 64 is received in the mounting frame 61. The mounting frame 61 can be mounted on the second supporting plate 217 with the fasteners 535 (shown in FIG. 8). An end of the mounting frame 61 defines a receiving hole 611. The damping piece 62 can be received in the receiving hole 611. When pressed, the damping piece 62 becomes compressed. The first wedge 63 defines a through hole 631. A cross section of the through hole 631 is D-shaped. The fixing shaft 53 can engage with the through hole 631. The first wedge 63 and the second wedge 64 have two opposite oblique surfaces. The two opposite oblique surfaces can make contact with each other. The rotation shaft 70 defines two through holes 71 for mounting the transferring member 80. Two spacers 72 can slide on two ends of the rotation shaft 70.

Figure 6:
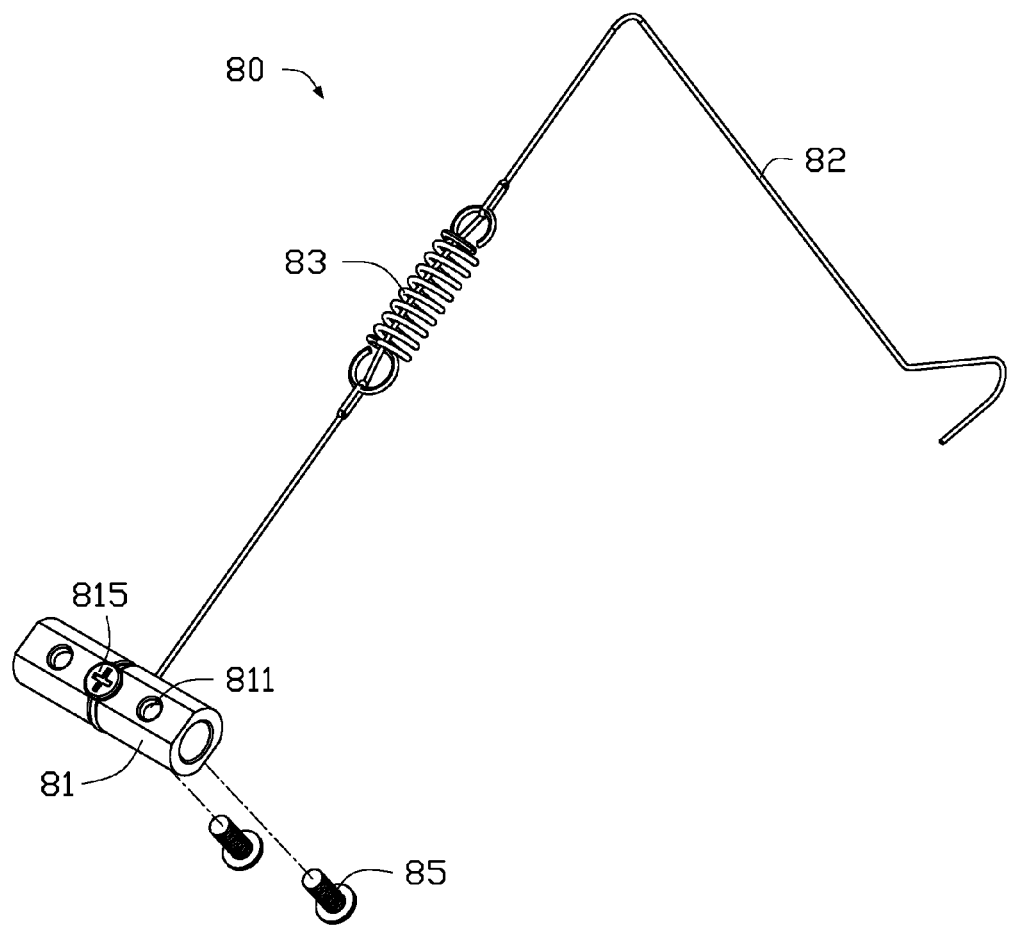
FIG. 6 is an exploded view of a transferring member of the support structure of FIG. 1.

FIG. 6 illustrates the transferring member 80 which includes a locking member 81, a transferring rope 82, and a third elastic piece 83. The locking member 81 can slide onto the rotation shaft 70. The locking member 81 defines two through holes 811 aligned with the two through holes 71. A number of fasteners 85 can pass through the through holes 71 and the through holes 811 to fix the locking member 81 to the rotation shaft 70. The fastener 85 can be engaged in the installing hole 111 to fix the locking member 81 to the display 10. The locking member 81 defines a latching hole (not labeled) between the two through holes 811. A fastener 815 is fixed in the latching hole. One end of the transferring rope 82 can go over and around the fastener 56 to fix in the screw hole 513 of the fastener 56. The other end of the transferring rope 82 can go over and around the fastener 815 to fix in the latching hole of the fastener 815. The transferring rope 82 can slidably go over and around the first pulley 235, the second pulley 52 and the third pulley 54. Two ends of the third elastic piece 83 are attached to the transferring rope 82.

Referring to FIGS. 7 and 8, the positioning plate 312 passes through the opening 222 to receive the operation plate 311 in the groove 221. The sleeve 32 is aligned with the through hole 313 of the positioning plate 312. The mounting member 315 passes the through hole 313 to engage in the sleeve 32 to connect the sleeve 32 to the button 31. The other end of the sleeve 32 is received in the ring 211. The first magnetic piece 321 is received in the ring 211. An end of the first elastic piece 33 is locked in the hook 215. The second elastic piece 34 is stretched and the ends of the second elastic piece 34 are locked in the locking groove 213 and in the connecting hole 323.

The supporting frame 50 is positioned on the base 20. The first supporting plate 51 is received in the recessed portion 231. The first magnetic piece 321 can attract the second magnetic piece 555 to make the second magnetic piece 555 touch the top plate 21. The connecting plate 511 and the fixing shaft 53 pass through the recessed portion 231 to be received in the receiving space 24. The other end of the first elastic piece 33 is engaged in the locking hole 512 (shown in FIG. 12). The first elastic piece 33 is stretched to pull on the connecting plate 511. The clamping piece 531 slides into the fixing shaft 53. The fasteners 535 pass through the clamping piece 531 to engage with the first supporting plates 216, to fix the clamping piece 531 to the base 20. The fixing shaft 53 can rotate in the clamping piece 531. The fixing shaft 53 rotates to enable the supporting frame 50 to rotate.

The two first wedges 63 slide onto the two ends of the fixing shafts 53. The damping piece 62 is received in the receiving hole 611. The second wedge 64 is received in the receiving hole 611. A position of the second wedge 64 can be adjusted to put the two opposite oblique surfaces of the first wedge 63 and the second wedge 64 in contact with each other. The mounting frame 61 is mounted on the second supporting plate 217 through the fasteners 535. The rotation shaft 70 passes through the two through holes 551. Two spacers 72 slide onto the two ends of the rotation shaft 70 to rotatably mount the rotation shaft 70 on the second supporting plate 55.

The locking member 81 slides onto the rotation shaft 70. The through holes 811 of the locking member 81 are aligned with the through holes 71 of the rotation shaft 70. The fasteners 85 are engaged in the through hole 71 and the through holes 811 to fix the locking member 81 to the rotation shaft 70. Two ends of the transferring rope 82 are twisted around the fastener 56 and the fastener 815. The fastener 56 is engaged in the screw hole 513 to fix one end of the transferring rope 82 to the connecting plate 511. The fastener 815 is engaged in the latching hole to fix the other end of the transferring rope 82 to the locking member 81. The transferring rope 82 goes over and around the first pulley 235, the second pulley 52, and the third pulley 54. The first elastic piece 83 abuts against the second supporting plate 55. The supporting structure 100 is thus assembled.

Figure 9:
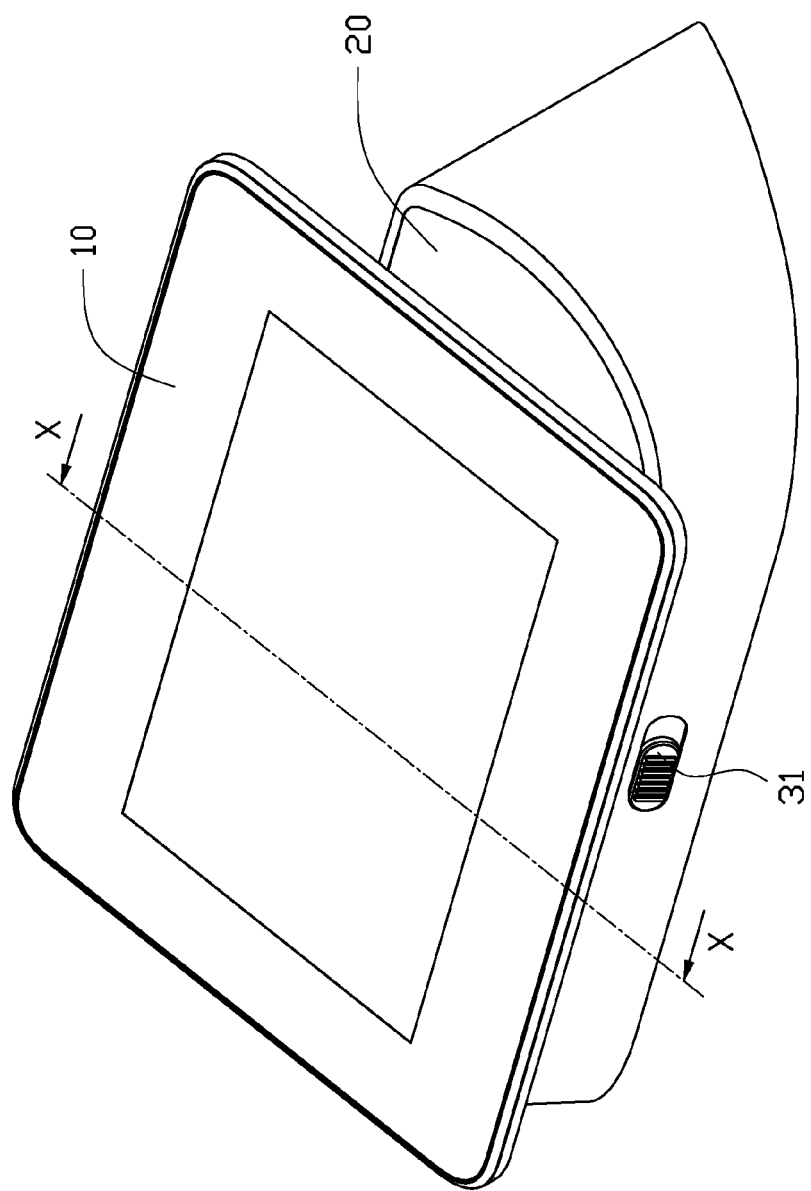
FIG. 9 is an isometric view of the display device in FIG. 1.

Turning now to FIGS. 9 and 10 to describe the supporting structure 100 that supports the display 10 when positioned on base 20. The second supporting plate 55 is received in the recessed portion 231. The installing holes 111 are aligned with the through holes 811. The fasteners 85 are engaged in the installing holes 111 to fix the display 10 to the supporting structure 100. When the operation plate 311 is pushed, the button 31 slides toward the second elastic piece 34. The first magnetic piece 321 attracts the second magnetic piece 555 to bring the second magnetic piece 555 into contact with the base 20. The first elastic piece 33 is stretched to pull on the first supporting plate 51.

Figure 11:
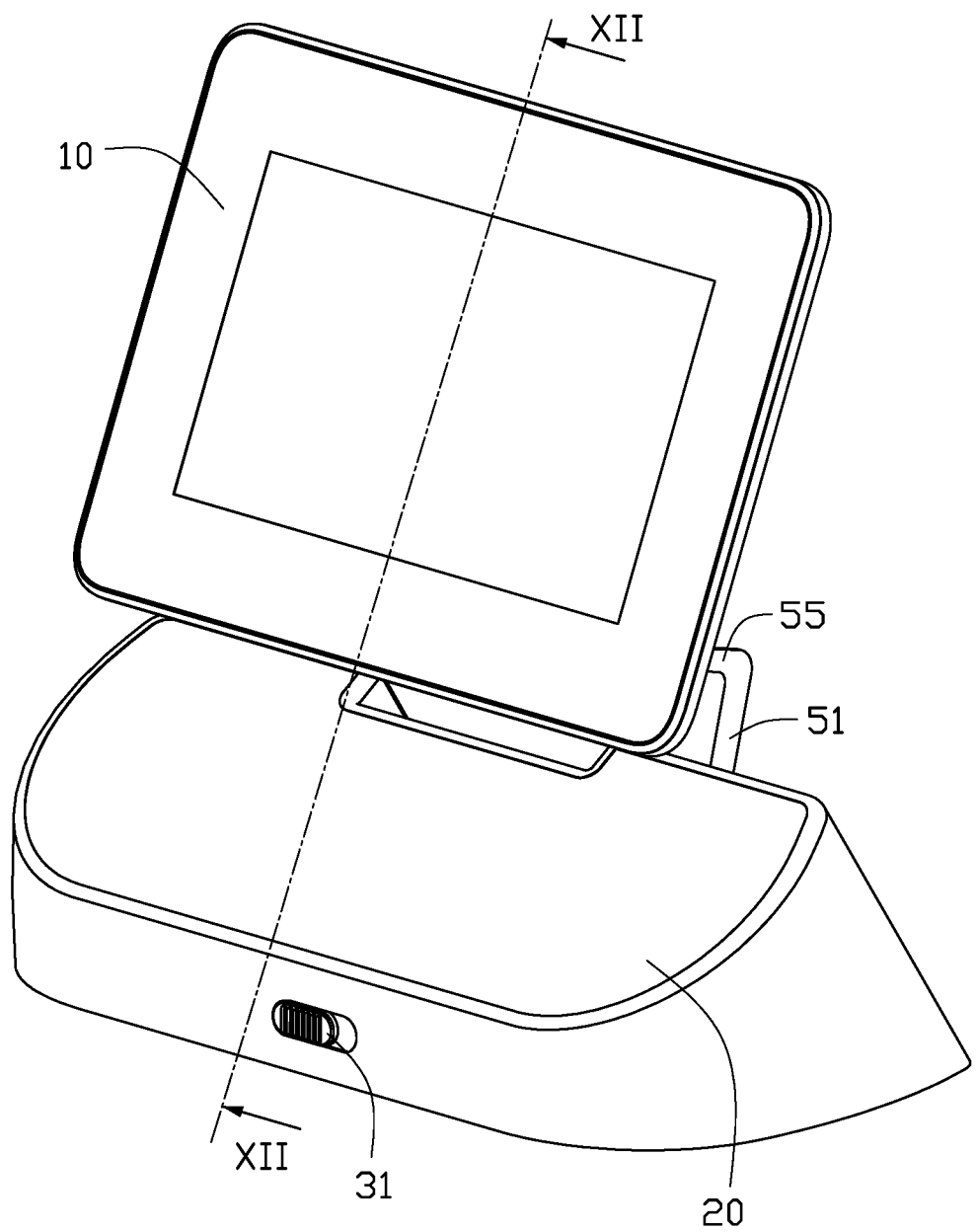
FIG. 11 is an alternate view of FIG. 9.

Referring to FIGS. 11 and 12, to adjust a height of the display 10, the operation plate 311 is made to slide away from the second elastic piece 34 thereby stretching the second elastic piece 34. The sleeve 32 slides to follow the positioning plate 312 thereby detaching the first magnetic piece 321 from the second magnetic piece 555. The first elastic piece 33 restores to pull the connecting plate 511. The supporting frame 50 rotates with the fixing shaft 53. The first wedge 63 rotates to follow the fixing shaft 53. During the rotation, the two opposite oblique surfaces of the first wedge 63 and the second wedge 64 move away from each other to make the first wedge 63 slide toward the mounting frame 61 to press against the second wedge 64. The second wedge 64 slides toward the mounting frame 61 to press on the damping piece 62. The damping piece 62 is compressed to provide a resistance to make the supporting frame 50 slowly rotate. During rotation of the supporting frame 50, the first supporting plate 51 moves out of the recessed portion 231. The second supporting plate 55 can move away from top plate 21 to greatly elevate the display 10.

The end of the transferring rope 82 attached to the connecting plate 511 slides toward the first elastic piece 33 under the pull from the connecting plate 511. The third elastic piece 83 is stretched to enable an end of the transferring rope 82 attached to the locking member to slide. The rotation shaft 70 rotates to enable the locking member 81 and the display 10 to also rotate to adjust a viewing angle of the display 10.

The embodiments shown and described above are only examples. Even though numerous descriptions and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A supporting structure configured to support a display, the supporting structure comprising:
   a base;
   a controlling member mounted to the base, the controlling member comprising a first elastic piece, one end of the elastic piece mounted on the base;
   a supporting frame connected to the display, the supporting frame attached to the other end of the elastic piece;
   a first magnetic piece positioned on the controlling member; and
   a second magnetic piece positioned on the supporting frame, the second magnetic piece configured to attract the first magnetic piece;
   wherein the first elastic piece retracts to enable the supporting frame to rotate, the controlling member is slidable mounted to the base to decouple the second magnetic piece from the first magnetic piece thereby allowing the first elastic piece to retract to rotate the supporting frame and change a height of the display.

2. The supporting structure of claim 1, wherein the supporting structure further comprises a locking member and a transferring rope, the locking member is rotatably mounted to one end of the supporting frame, one end of the transferring rope is mounted on the locking member, the other end of the transferring rope passes through the base to be mounted on an inside portion of the supporting frame, when the supporting frame rotates, the first elastic piece pulls the transferring rope to rotate the locking member to change the viewing angle of the display.

3. The supporting structure of claim 1, wherein the supporting frame comprises a first supporting plate and a second supporting plate attached to the first supporting plate, one end of the first elastic piece is locked to the first supporting plate, the display and the second magnetic piece are mounted on the second supporting plate.

4. The supporting structure of claim 3, wherein a connecting plate protrudes from an edge of the first supporting plate, the connecting plate defines a locking hole, one end of the first elastic piece is mounted on the locking hole, the first elastic piece retracts to rotate the first supporting plate.

5. The supporting structure of claim 4, wherein two fixing shafts protrude from the first supporting plate and are positioned on two opposite sides of the connecting plate, a clamping piece is mounted on the base and is rotatably coupled to a distal end of the fixing shaft, the fixing shaft is rotatably attached to the clamping piece to rotate the first supporting plate.

6. The supporting structure of claim 5, wherein two damping members slide onto the two fixing shafts, and the two damping members provide resistance to prevent the supporting frame from rotating.

7. The supporting structure of claim 6, wherein each of the two damping members comprise a mounting frame mounted on the base, a damping piece, a first wedge and a second wedge, the damping piece is received in the mounting frame, the first wedge slides onto the fixing shaft, and the second wedge is received in the mounting frame, wherein the first wedge rotates with the fixing shaft and presses the second wedge against the damping piece.

8. The supporting structure of claim 3, wherein a rotation shaft is rotatably mounted to an end of the second supporting plate away from the first supporting plate, the locking member slides onto the rotation shaft, and the rotation shaft rotates to enable the locking member to rotate.

9. The supporting structure of claim 1, wherein the base comprises a front plate, the front plate defines a groove and an opening formed within the groove, the controlling member comprises a button and a second elastic piece, the button passes through the opening to be slidably received in the groove, the second elastic piece retracts to restore the button.

10. The supporting structure of claim 9, wherein the base further comprises a top plate, the front plate is attached at an edge of the top plate, a ring protrudes from an inside portion of the top plate adjacent to the front plate, the controlling member is received in the ring.

11. A display device comprising:
a base;
a controlling member mounted to the base, the controlling member comprising a first elastic piece, one end of the elastic piece on the base;
a supporting frame;
a display mounted on the supporting frame;
a first magnetic piece positioned on the controlling member; and
a second magnetic piece positioned on the supporting frame, the second magnetic piece configured to attract the first magnetic piece;
wherein two ends of the elastic piece are attached to the base and the supporting frame, the first elastic piece retracts to enable the supporting frame to rotate, the controlling member is slidable mounted to the base to decouple the second magnetic piece from the first magnetic piece thereby allowing the first elastic piece to retract to rotate the supporting frame and change a height of the display.

12. The display device of claim 11, wherein the display device further comprises a locking member and a transferring rope, the locking member is rotatably mounted to one end of the supporting frame, one end of the transferring rope is mounted on the locking member, the other end of the transferring rope passes through the base to be mounted on an inside portion of the supporting frame, when the supporting frame rotates, the first elastic piece pulls the transferring rope to rotates the locking member to change the viewing angle of the display.

13. The display device of claim 11, wherein the supporting frame comprises a first supporting plate and a second supporting plate attached to the first supporting plate, one end of the first elastic piece is locked to the first supporting plate, the display and the second magnetic piece are mounted on the second supporting plate.

14. The display device of claim 13, wherein a connecting plate protrudes from an edge of the first supporting plate, the connecting plate defines a locking hole, one end of the first elastic piece is mounted on the locking hole, the first elastic piece retracts to rotate the first supporting plate.

15. The display device of claim 14, wherein two fixing shafts protrude from the first supporting plate and are positioned on two opposite sides of the connecting plate, a clamping piece is mounted on the base and is rotatably coupled to a distal end of the fixing shaft, the fixing shaft is rotatably attached to the clamping piece to rotate the first supporting plate.

16. The display device of claim 15, wherein two damping members slides onto the two fixing shafts, and the two damping members provides resistance to prevent the supporting frame from rotating.

17. The display device of claim 16, wherein each of the two the damping members comprise a mounting frame mounted on the base, a damping piece, a first wedge and a second wedge, the damping piece is received in the mounting frame, the first wedge slides onto the fixing shaft, and the second wedge is received in the mounting frame, wherein the first wedge rotates with the fixing shaft and presses the second wedge against the damping piece.

18. The display device of claim 13, wherein a rotation shaft is rotatably mounted to an end of the second supporting plate away from the first supporting plate, the locking member slides onto the rotation shaft, and the rotation shaft rotates to enable the locking member to rotate.

19. The display device of claim 11, wherein the base comprises a front plate, the front plate defines a groove and an opening formed within the groove, the controlling member comprises a button and a second elastic piece, the button passes through the opening to be slidably received in the groove, the second elastic piece retracts to restore the button.

20. The display device of claim 19, wherein the base further comprises a top plate, the front plate is attached an edge of the top plate, a ring protrudes from an inside portion of the top plate adjacent to the front plate, the controlling member is received in the ring.

* * * * *